June 9, 1964 W. V. CHERY 3,136,046
METHOD OF MANUFACTURING SLIDE FASTENER ELEMENTS
Original Filed April 6, 1961 2 Sheets-Sheet 1
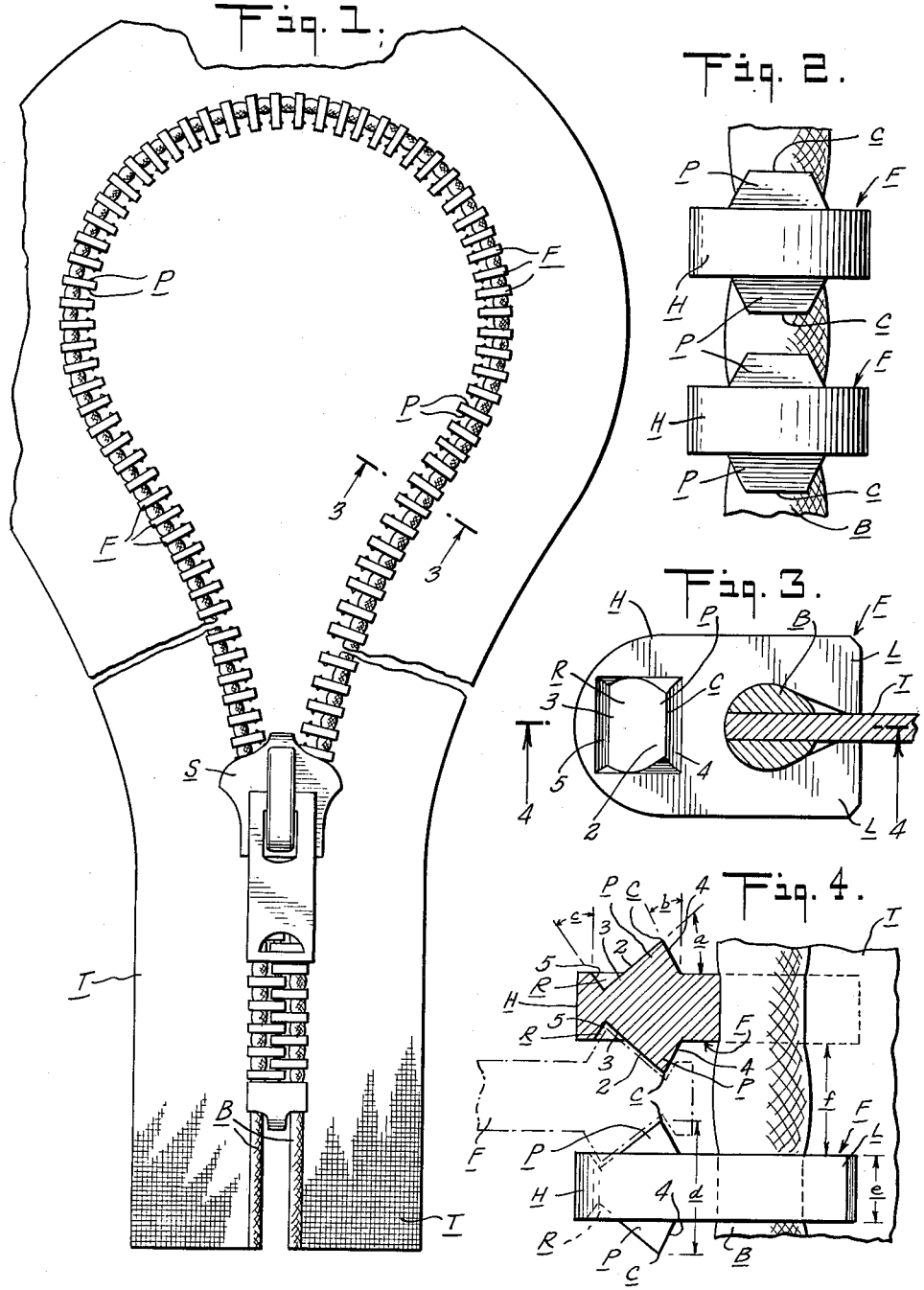
INVENTOR.
WALTER V. CHERY
BY R. E. Meech
ATTORNEY June 9, 1964   W. V. CHERY   3,136,046
METHOD OF MANUFACTURING SLIDE FASTENER ELEMENTS
Original Filed April 6, 1961   2 Sheets-Sheet 2
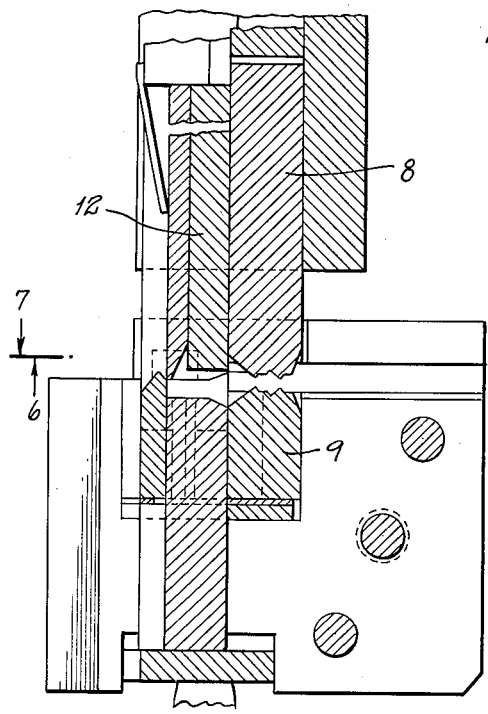
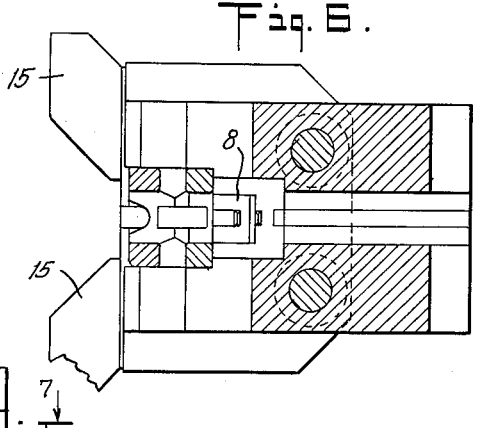
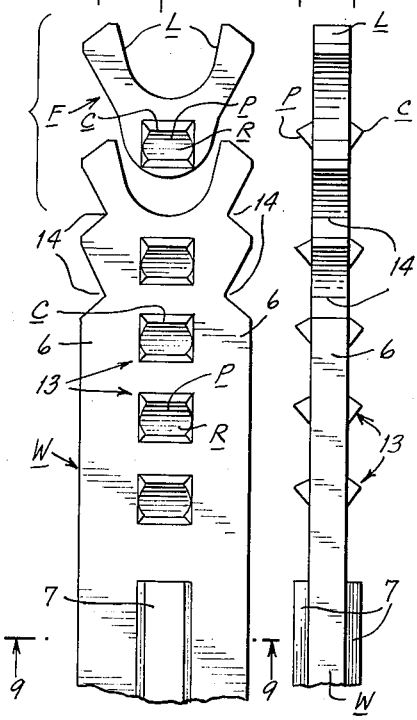
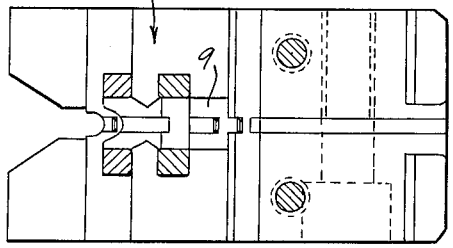
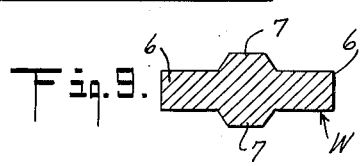
INVENTOR.
WALTER V. CHERY
BY R. E. Meech
ATTORNEY United States Patent Office 3,136,046
Patented June 9, 1964

3,136,046
METHOD OF MANUFACTURING SLIDE
FASTENER ELEMENTS
Walter V. Chery, Meadville, Pa., assignor to Talon, Inc., a corporation of Pennsylvania
Original application Apr. 6, 1961, Ser. No. 101,258. Divided and this application June 27, 1962, Ser. No. 205,785
4 Claims. (Cl. 29—410)

This invention relates to slide fasteners and more particularly to an improved method of manufacturing a fastener element therefor of the so-called double-acting or two-way type.

This application is a division of my co-pending application Serial No. 101,258, filed April 6, 1961, now abandoned.

Various types of fastener elements for slide fasteners of the so-called double-acting or two-way type have heretofore been suggested and produced commercially. Such a fastener is one which will operate satisfactorily regardless of the direction in which the slider is disposed thereon relative to the top or bottom of the elements. Such a construction makes it possible to employ two oppositely directed sliders on a pair of stringers or to fold a stringer upon itself to provide a slide fastener for special applications thereof. Heretofore, most fastener elements of this type were die cast or molded which was an inconvenient and expensive method of making such a fastener element. Others were made from wire stock, but such methods heretofore suggested for employing the wire stock method were not satisfactory, primarily, for the reason that usually there was not sufficient metal in the head portion of the element blank to form consistently satisfactory interlocking projections thereon. Also, it was necessary to employ expensive tools and dies which were difficult to maintain and replace and the cost was prohibitive. Further, it was difficult and practically impossible to maintain consistently the required tolerances in the practice of such methods and an unsatisfactory fastener resulted.

It is one of the objects of the present invention to provide an improved interlocking fastener element for slide fasteners which is symmetrical, top and bottom, whereby slide fastener stringers, including such elements, are reversible end-for-end, and whereby the element may be interengaged with one another by a conventional slider in movement of the slider in either direction along the stringers.

It is another object of the invention to provide such an interlocking fastener element which is of a simple construction and, at the same time, one that provides a rugged and strong fastener, and which is sufficiently supple and provides adequate flexibility in operation without sacrificing strength or durability.

It is a further object of this invention to provide such a fastener element having complementary interlocking projections and recesses which are substantially triangular shape in cross section and which are constructed and arranged so as to have the proper relative dimensions to provide a satisfactory operable fastener.

It is still another object of the present invention to provide an improved method of manufacturing a fastener element of the double-acting or two-way type which is efficient and effective so as to provide a most satisfactory fastener of this type.

It is a more specific object of this invention to manufacture a fastener element of this type from a continuous strip of wire stock wherein there is provided medial raised or thickened portions on both sides thereof whereby the interlocking projections and recesses may be easily and conveniently formed therein with inexpensive tools and other equipment and attached to the stringer tape.

Various other objects and advantages of this invention will be more apparent in the course of the following specification, and will be particularly pointed out in the appended claims.

In the accompanying drawings, there is shown for the purpose of illustration, an embodiment which my invention may assume in practice.

In these drawings:

FIG. 1 is a plan view of a slide fastener stringer folded around and together to provide a slide fastener having improved fastener elements in accordance with the present invention incorporated therewith, FIG. 2 is an enlarged view of a pair of fastener elements constructed according to the present invention, FIG. 3 is an enlarged sectional view taken on line 3—3 of FIG. 1, FIG. 4 is a sectional view taken on line 4—4 of FIG. 3, FIG. 5 is a cross sectional view of the combined male and female die members, the notching punches, and the cut-off punch for fabricating the strip, FIG. 6 is a sectional view taken on line 6—6 of FIG. 5, FIG. 7 is a sectional view taken on line 7—7 of FIG. 5, FIG. 8 is a plan view of the strip of wire stock from which my fastener element is formed in accordance with the present invention showing the embossed portions thereon and a fastener element severed from the end thereof, FIG. 9 is a sectional view taken on line 9—9 of FIG. 8, and FIG. 10 is an edge view of the strip as shown in FIG. 8.

Referring more particularly to FIGS. 1 through 4 of the drawings, the improved fastener element F in accordance with the present invention consists of a head portion H having a pair of outwardly extending spaced-apart leg portions L. The fastener element is symmetrical top and bottom having oppositely disposed concentric projections P on the top and bottom surfaces of the head portion H thereof and oppositely disposed concentric recesses R directly next thereto substantially complementary with the projections. That is, to say, the projections and recesses are disposed directly opposite one another on the top and bottom surfaces and are identical. Both the projections P and recesses R are substantially triangular shape in cross section and each of the projections preferably has a relatively sharp crown, as at C.

The outer wall 2 of each of the projections P is contiguous with the inner wall 3 of the adjacent recess R, as more clearly shown in FIGS. 3 and 4 of the drawings. These contiguous walls 2 and 3 are preferably arranged at an angle of approximately from forty to sixty degrees to the plane of the leg portions L, designated at $a$ in FIG. 4. The inclined inner wall 4 of each of the projections P is arranged preferably at an angle of approximately fifteen to twenty degrees to a plane perpendicular to the leg portions, designated at $b$ in FIG. 4, and the outer wall 5 of each of the recesses is arranged preferably at an angle of approximately thirty degrees to a plane perpendicular to the leg portions, designated at $c$. The overall height of the projections P, designated at $d$ in FIG. 4, is approximately twice the thickness of the leg portions L, designated at $e$. It has been found that a most satisfactory fastener element of this type is obtained by providing such dimensions as above set forth.

After the fastener elements are thus formed, they are attached to the beaded edge B of a stringer tape T by means of the leg or jaw portions L which are clamped thereto in a well known manner, and a fastener may be provided as shown in FIG. 1. It will be understood that a slider S is mounted on the fastener elements F for engaging and disengaging the same in its longitudinal movement therealong, and an end stop may be provided, if desired, for holding the ends of the stringers permanently together. When the fastener elements are interengaged with one another, it will be understood that the projections and recesses on the surface of one element engage and interlock with the identical projections and recesses on the surface of the next successive fastener element along the stringer tape, as clearly shown in FIG. 4. It will be understood that the fastener elements are spaced-apart along the stringer tape T, as designated at *f*, a distance from one another of approximately 1.5 to 1.7 times the thickness *e* of one of the fastener elements E and just slightly less (eight to ten thousandths) than the overall height *d* of the projections P which is another important aspect of the invention.

In accordance with the method of the present invention, as shown in FIGS. 5 through 10 of the drawings, my improved fastener element is fabricated in the following manner. A strip is formed, preferably by rolling a continuous length of wire stock W having web portions 6 and a medial raised portion 7 on each side thereof, as shown in FIGS. 8, 9 and 10 of the drawings.

The strip, thus formed is then introduced into a chain machine and between dies therein for forming the elements successively therefrom. There is provided in such machine a pair of identical upper and lower combined male and female die members 8 and 9, respectively, a pair of notching punches 10 directly next thereto and a cut-off punch 12 all in tandem. As the strip W passes into the machine and between the die members therein, the medial raised portions 7 of each side of the strip are deformed by the opposed combined male and female die members 8 and 9 so as to provide a series of embossed portions 13 extending longitudinally along the strip on both sides thereof, as shown in FIGS. 8 and 10. Each of these embossed portions constitute a projection P and a recess R of a single fastener element F which will later be severed therefrom.

In the next step a pair of triangular shape notches 14 are punched out of the web portions 6 at either side thereof by means of the notching punches 10, which notches are disposed opposite and laterally from one another with the edges thereof conforming to the desired outer edges of the leg portions L of the fastener element F.

As the strip passes further into and through the machine, completely formed fastener elements F are successively severed from the end of the strip, as shown in FIG. 8, by means of the cut-off punch 12 with each element having an outline conforming to the outer configuration of a fastener element. Immediately thereafter or almost simultaneously therewith the leg portions L of the fastener element are clamped around the beaded edge B of the stringer tape T by means of reciprocating side tools 15 in a manner well known to those skilled in the art so as to provide a completed slide fastener stringer with a series of spaced apart fastener elements F arranged along the edge thereof, as shown in FIG. 1. It will be understood that the combined male and female die members, 8 and 9, the notching punches 10, and the cut-off punch 12 all act in unison on the strip so that the embossed portions 13, the notches 14 are formed, and a fastener element F cut from the strip simultaneously.

As a result of my invention, it will be seen that there is provided an improved method of manufacturing a fastener element for slide fasteners of the so-called two-way or double acting type which provides an element of this type that is satisfactory in every respect. In the practice of the method of the present invention it will be seen that a most satisfactory head or projection height is obtained due primarily to the provision of a wire strip having medial raised portions on both sides thereof from which the projections are formed which is an important aspect of the invention. In this method it will be seen that these medial raised portions may be deformed and the metal thereof made to flow easily to form these projections and recesses with the use of simple and inexpensive tools, thus, reducing the replacement and maintenance cost of such tools to a minimum.

It will be seen further that the fastener of the present invention is not stiff but extremely supple and flexible due primarily to the fact that the distance the fastener elements are spaced from one another along the stringer tape is slightly more than one and one-half times the thickness of the fastener elements and the over-all height of the projections is only slightly greater than the distance between the fastener elements so as to provide ample clearance and yet a satisfactory interlock between the elements.

While I have shown and described an embodiment which my invention may assume in practice, it will be understood that this embodiment is merely for the purpose of illustration and description, and that other forms may be devised within the scope of my invention as defined in the appended claims.

I claim:

1. In a method of manufacturing slide fastener elements each comprising an embossed portion and a pair of spaced apart leg portions extending outwardly therefrom, the embossed portion having a recess on each side thereof directly opposite one another and a projection on each side thereof positioned rearwardly of said recesses between the same and said leg portions and positioned directly opposite one another, the steps of forming a continuous strip of wire stock so as to provide a strip having web portions and a medial raised portion on each side of the strip, simultaneously deforming the raised portion on each side of the strip at spaced intervals so as to provide a longitudinal extending series of embossed portions on each side of the strip with the embossed portions on one side being positioned directly opposite those on the other side, and a recess positioned immediately forwardly of each of said embossed portions and directly opposite one another, and finally severing the strip transversely thereof on outlines conforming to the desired outer configuration defining the fastener element.

2. In a method of manufacturing slide fastener elements each comprising an embossed portion and a pair of spaced apart leg portions extending outwardly therefrom, the embossed portion having a recess on each side thereof directly opposite one another and a projection on each side thereof positioned rearwardly of said recesses between the same and said leg portions and positioned directly opposite one another, the steps of forming a continuous strip of wire stock so as to provide a strip having web portions and a medial raised portion on each side of the strip, simultaneously deforming the raised portion on each side of the strip at spaced intervals so as to provide a longitudinal extending series of embossed portions on each side of the strip with the embossed portions on one side being positioned directly opposite those on the other side, and a recess positioned immediately forwardly of each of said embossed portions and directly opposite one another, punching out a pair of oppositely and laterally disposed notches in the web portions of said strip at a point forwardly of said embossed portions with edges conforming substantially to the outer sides of said leg portions, and finally severing the strip transversely thereof on outlines conforming to the desired outer configuration defining the fastener element.

3. In the manufacture of an embossed fastener element from a strip of wire stock having web portions and a medial raised portion on each side of the strip, the steps of simultaneously applying an identical combination male and female die members to the raised portion on each side of the strip directly opposite one another, applying pressure between said members to form in each of said raised portions a longitudinal extending series of spaced-apart projections and recesses positioned directly opposite one another, each of said recesses being positioned forwardly of each of the respective projections, and thereafter cutting individual fastener elements from the strip so that each has a projection and recess thereon.

4. In the manufacture of an embossed fastener element from a strip of wire stock having web portions and a medial raised portion on each side of the strip, the steps of simultaneously applying an identical combination male and female die members to the raised portion on each side of the strip directly opposite one another, applying pressure between said members to form in each of said raised portions a longitudinal extending series of spaced-apart projections and recesses positioned directly opposite one another, each of said recesses being positioned forwardly of each of the respective projections, simultaneously punching a pair of oppositely and laterally notches in the web portion of said strip at a point forwardly of said die members, and simultaneously cutting individual fastener elements from the end of said strip so that each has a projection and recess thereon and an outline conforming to the desired outer configuration defining the fastener element.

References Cited in the file of this patent

UNITED STATES PATENTS

| | | |
|---|---|---|
| 2,612,795 | Kaufman | Oct. 7, 1952 |
| 2,685,127 | Kaufman | Aug. 3, 1954 |